US008868337B2

(12) United States Patent
Pierfelice

(10) Patent No.: US 8,868,337 B2
(45) Date of Patent: Oct. 21, 2014

(54) VEHICLE NAVIGATION SYSTEMS AND METHODS FOR PRESENTING INFORMATION ORIGINATING FROM A MOBILE DEVICE

(75) Inventor: Jeffrey E. Pierfelice, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 189 days.

(21) Appl. No.: 13/541,115

(22) Filed: Jul. 3, 2012

(65) Prior Publication Data

US 2014/0012497 A1 Jan. 9, 2014

(51) Int. Cl.
*G01C 21/36* (2006.01)

(52) U.S. Cl.
USPC ........... 701/454; 701/426; 701/450; 701/461; 340/995.14; 340/995.24

(58) Field of Classification Search
CPC .. G01C 21/20; G01C 21/3679; G01C 21/362; G01C 21/26; G01C 21/36; G01C 21/3682; G01C 21/3611; G01C 21/3614; G01C 21/3644; G09B 29/106; G08G 1/20; G08G 1/0969; H04W 4/003; H04W 4/02; G06F 17/30
USPC ................. 701/425, 426, 450, 451, 454, 461; 340/995.14, 995.16, 995.24
See application file for complete search history.

(56) References Cited

U.S. PATENT DOCUMENTS

| | | | |
|---|---|---|---|
| 6,812,942 B2 | 11/2004 | Ribak | |
| 7,174,301 B2 * | 2/2007 | Florance et al. | 705/313 |
| 7,912,646 B2 | 3/2011 | McCarthy et al. | |
| 8,095,260 B1 | 1/2012 | Schofield et al. | |
| 8,160,815 B2 * | 4/2012 | Geelen | 701/410 |
| 8,239,130 B1 * | 8/2012 | Upstill et al. | 701/426 |
| 8,255,154 B2 * | 8/2012 | Zilka | 701/408 |
| 8,265,862 B1 * | 9/2012 | Zilka | 340/988 |
| 8,433,512 B1 * | 4/2013 | Lopatenko et al. | 701/426 |
| 8,566,029 B1 * | 10/2013 | Lopatenko et al. | 701/426 |
| 8,589,069 B1 * | 11/2013 | Lehman | 701/438 |
| 8,620,579 B1 * | 12/2013 | Upstill et al. | 701/426 |
| 2006/0182055 A1 * | 8/2006 | Coffee et al. | 370/328 |
| 2010/0235045 A1 | 9/2010 | Craig et al. | |
| 2011/0185390 A1 | 7/2011 | Faenger et al. | |
| 2011/0225532 A1 | 9/2011 | Isert et al. | |
| 2011/0291863 A1 | 12/2011 | Ozaki et al. | |

FOREIGN PATENT DOCUMENTS

EP 2469232 6/2012

OTHER PUBLICATIONS

International Search Report and Written Opinion of PCT/US2013/024594, mailed May 16, 2013.

* cited by examiner

*Primary Examiner* — Russell Frejd
(74) *Attorney, Agent, or Firm* — Dinsmore & Shohl LLP

(57) ABSTRACT

Vehicle navigation systems and methods for presenting information originating from a mobile device on a vehicle navigation system display of a vehicle are disclosed. In one embodiment, a method of presenting information originating from a mobile device on a vehicle navigation system display of a vehicle includes receiving, by a vehicle navigation system, application data from an application operating on the mobile device, wherein the application data from the application represents an entity in proximity to the vehicle. The method further includes displaying an icon representing the application data from the application on a map presented on the vehicle navigation system display. The icon is positioned on the map according to a geographic location of the entity.

18 Claims, 7 Drawing Sheets

VEHICLE NAVIGATION SYSTEMS AND METHODS FOR PRESENTING INFORMATION ORIGINATING FROM A MOBILE DEVICE

TECHNICAL FIELD

The present specification generally relates to vehicle navigation systems and, more particularly, to vehicle navigation systems configured to receive application data from applications running on a communicatively coupled mobile device.

BACKGROUND

Vehicle navigation systems are used in vehicles to present information to a driver and/or passenger of a vehicle. Such information may include geographic information, such as a map of roads that are in proximity to the vehicle. Other information may also be presented, such as traffic information and, in the case of infotainment systems, audio features such as radio functionality, compact disc player functionality, digital music playback functionality, and the like.

Mobile devices, such as smart phones, tablet computers, and the like, may run a plurality of applications that have particular functions. The functions may include social media functions (e.g., Twitter, Facebook, etc.), presentation of surrounding business information (e.g., OpenTable, Yelp!, etc.), presentation of general information (weather applications, sports scores) and productivity functions (word processing, calculators, etc.). Accordingly, mobile devices are capable of receiving and providing a large amount of useful information.

SUMMARY

According to one embodiment, a method of presenting information originating from a mobile device on a vehicle navigation system display of a vehicle includes receiving, by a vehicle navigation system, application data from an application operating on the mobile device, wherein the application data from the application represents an entity in proximity to the vehicle. The method further includes displaying an icon representing the application data from the application on a map presented on the vehicle navigation system display. The icon is positioned on the map according to a geographic location of the entity.

According to another embodiment, a vehicle navigation system includes one or more processors, a vehicle navigation system display communicatively coupled to the one or more processors, a user input device communicatively coupled to the one or more processors, a satellite module communicatively coupled to the one or more processors and configured to provide geographic location data to the one or more processors, and a computer-readable medium storing computer-executable instructions. The computer-executable instructions, when executed by the one or more processors, cause the vehicle navigation system to receive the geographic location data from the satellite module. The geographic location data is indicative of a geographic location of a vehicle associated with the vehicle navigation system. The computer-executable instructions further cause the vehicle navigation system to generate and display a map corresponding to a proximity of the geographic location of the vehicle, and receive application data from an application operating on a mobile device, wherein the application data from the application represents an entity in proximity to the vehicle. In accordance with the computer-executable instructions, the vehicle navigation system further displays an icon representing the application data from the application on the map, wherein the icon is positioned on the map according to a geographic location of the entity.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to navigation systems, such as vehicle navigation systems, and methods wherein information generated or otherwise provided by an application running on a mobile device, such as a cell phone, is sent to the navigation system and displayed at a geographic location on a map that is presented on the display of the navigation system. For example, an application running on the mobile device may be configured to determine entities that are in proximity to the mobile device, and provide information regarding such entities. For example, the entities may be nearby points of interest, such as restaurants. The information provided by the application may include names of the restaurants, physical addresses of the restaurants, price ranges of the particular dishes served by the restaurants, and the like. In the embodiments described herein, application data provided by the various applications is communicated from the mobile device to the navigation system, and icons representing the entities are displayed at the appropriate location on the map according to the physical addresses of the entities. A user may then select an icon for more detail regarding the entity, and to take further action, such as request directions to the selected entity. As described in detail below, embodiments may also provide the ability for the navigation system to detect compatible applications running on the mobile device, and the ability for a user to select the application data for which applications he or she wishes to be displayed on the display of the navigation system.

Various embodiments of methods for presenting information originating from a mobile device on a navigation system, as well as navigation system capable of receiving and displaying application data from a mobile device, are described in detail below.

Figure 1:
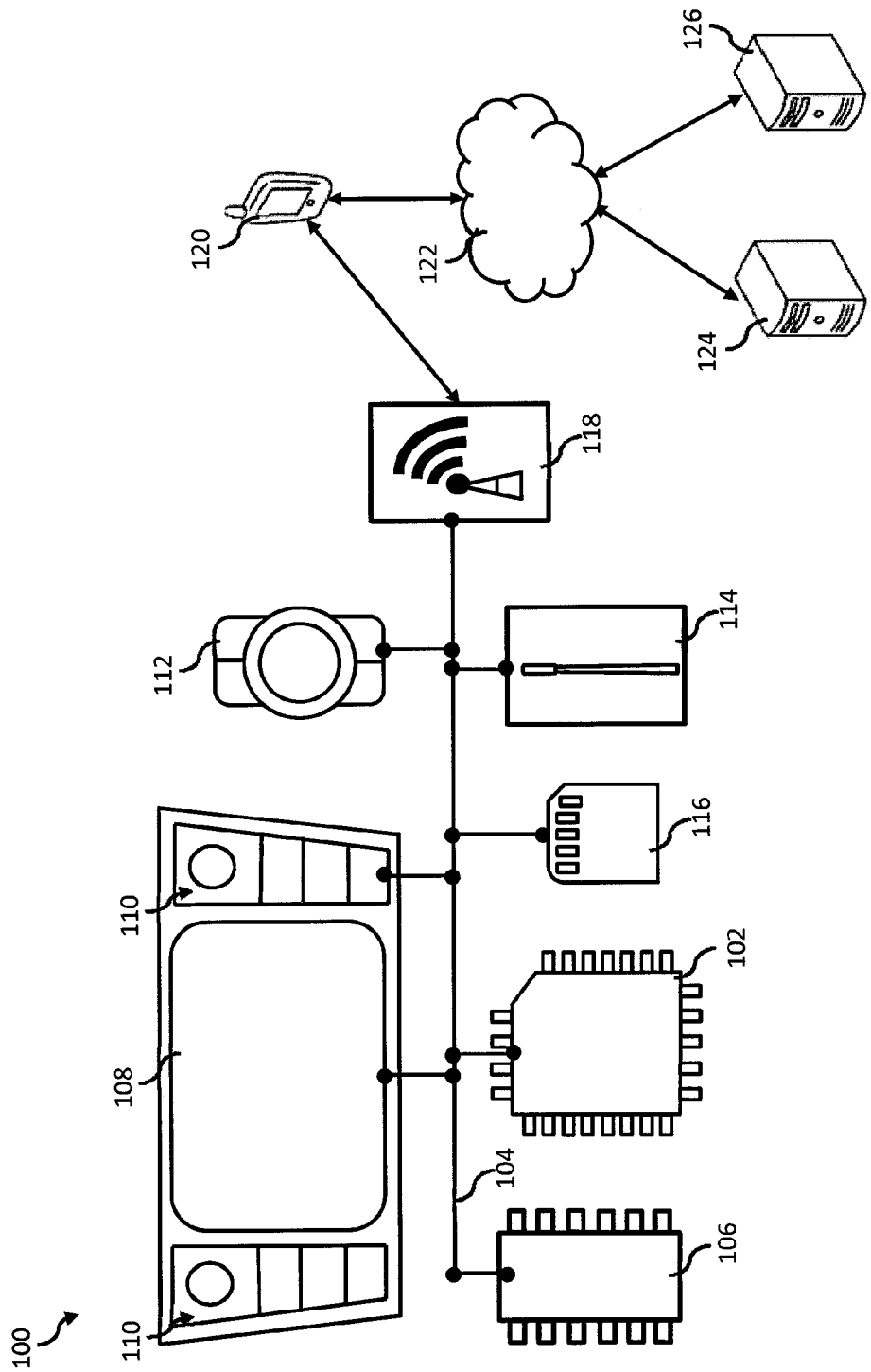
FIG. 1 schematically depicts a vehicle navigation system communicatively coupled to a mobile device, a cellular network, and one or more servers according to one or more embodiments described and illustrated herein.

Referring now to FIG. 1, an embodiment of a navigation system 100 is schematically depicted. It is noted that, while the navigation system 100 is depicted in isolation, the navigation system 100 may be coupled to a vehicle (not depicted in the figures). The vehicle may be an automobile or any other passenger or non-passenger vehicle such as, for example, a terrestrial, aquatic, and/or airborne vehicle. Although the navigation system is referred to herein as a vehicle navigation system, it should be understood that in some embodiments the navigation system may not be associated with a vehicle, such as hand-held global positioning system (GPS) units.

The vehicle navigation system 100 may include one or more processors 102. Each of the one or more processors 102 can be any device capable of executing machine readable instructions. Accordingly, each of the one or more processors 102 may be a controller, an integrated circuit, a microchip, a computer, or any other computing device. The one or more processors 102 can be coupled to a communication path 104 that provides signal interconnectivity between various modules of the vehicle navigation system 100. Accordingly, the communication path 104 can communicatively couple any number of processors with one another, and allow the modules of the vehicle navigation system 100 coupled to the communication path 104 to operate in a distributed computing environment. Specifically, each of the modules can operate as a node that may send and/or receive data. As used herein, the term "communicatively coupled" means that coupled components are capable of exchanging data signals with one another such as, for example, electrical signals via conductive medium, over-the-air electromagnetic signals, optical signals via optical waveguides, and the like.

Accordingly, the communication path 104 can be formed from any medium that is capable of transmitting a signal such as, for example, conductive wires, conductive traces, optical waveguides, or the like. Moreover, the communication path 104 can be formed from a combination of mediums capable of transmitting signals. In one embodiment, the communication path 104 can comprise a combination of conductive traces, conductive wires, connectors, and buses that cooperate to permit the transmission of electrical data signals to components such as processors, memories, sensors, input devices, output devices, and communication devices. Accordingly, the communication path 104 can comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle navigation system 100 may include one or more memory modules 106 coupled to the communication path 104. The one or more memory modules 106 may be configured as RAM, ROM, flash memories, hard drives, and/or any device capable of storing machine readable instructions such that the machine readable instructions can be accessed by the one or more processors 102. The machine readable instructions can comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, the vehicle navigation system 100 comprises a display 108 for providing visual output such as, for example, maps, navigation, entertainment, information, or combinations thereof. The display 108 can be coupled to the communication path 104. Accordingly, the communication path 104 can communicatively couple the display 108 to other modules of the vehicle navigation system 100. The display 108 can include any medium capable of transmitting an optical output such as, for example, a cathode ray tube, light emitting diodes, a liquid crystal display, a plasma display, or the like. Moreover, the display 108 can be a touch screen that, in addition to providing optical information, detects the presence and location of a tactile input upon a surface of or adjacent to the display. Accordingly, each display can receive mechanical input directly upon the optical output provided by the display. Additionally, it is noted that the display 108 can include at least one of the one or more processors 102 and the one or more memory modules 106.

In some embodiments, the vehicle navigation system 100 may also comprise tactile input hardware 110 coupled to the communication path 104 such that the communication path 104 communicatively couples the tactile input hardware 110 to other modules of the vehicle navigation system 100. The tactile input hardware 110 can be any device capable of transforming mechanical, optical, or electrical signals into a data signal capable of being transmitted with the communication path 104. Specifically, the tactile input hardware 110 can include any number of movable objects that each transform physical motion into a data signal that can be transmitted over the communication path 104 such as, for example, a button, a switch, a knob, a microphone or the like. In some embodiments, the display 108 and the tactile input hardware 110 can be combined as a single module and operate as an audio head unit or an infotainment system of a vehicle. However, it is noted, that the display 108 and the tactile input hardware 110 can be separate from one another and operate as a single module by exchanging signals via the communication path 104.

The vehicle navigation system 100 may also include a peripheral tactile input 112 coupled to the communication path 104 such that the communication path 104 communicatively couples the peripheral tactile input 112 to other modules of the vehicle navigation system 100. For example, in one embodiment, the peripheral tactile input 112 can be located in a vehicle console to provide additional location for receiving input. The peripheral tactile input 112 operates in a manner substantially similar to the tactile input hardware 110, i.e., the peripheral tactile input 112 includes movable objects and transforms motion of the movable objects into a data signal that can be transmitted over the communication path 104. For example, the peripheral tactile input 112 may be configured as a moveable joystick or knob.

The vehicle navigation system 100 further comprises a satellite module 114 coupled to the communication path 104 such that the communication path 104 communicatively couples the satellite module 114 to other modules of the vehicle navigation system 100. The satellite module 114 is configured to receive signals from global positioning system satellites. Specifically, in one embodiment, the satellite module 114 can include one or more conductive elements acting as an antenna that interact with electromagnetic signals transmitted by global positioning system satellites. The received signal can be transformed into a data signal indicative of the location (e.g., latitude and longitude) of the satellite module 114 or an object positioned near the satellite module 114, by the one or more processors 102. The received signal can be transformed that corresponds to the location (e.g., latitude and longitude) of the satellite module 114. Additionally, it is noted that the satellite module 114 can include at least one of the one or more processors 102 and the one or more memory modules 106.

In embodiments where the vehicle navigation system 100 is coupled to a vehicle, the one or more processors 102 can execute machine readable instructions to transform the signals received by the satellite module 114 into data indicative of the positioning of the vehicle with respect to road data, i.e., the vehicle position can be indicated on a map. The road data can be stored as machine readable instructions in the one or more memory modules 106. Alternatively or additionally, road data can be stored on a removable data module 116. Specifically, the removable data module 116 can be coupled to the communication path 104 via a socket with a movable member. The movable member can transition between states that apply varying amounts of force to the removable data module 116. Accordingly, the removable data module 116 can be optical media, solid state flash memory (e.g., USB or memory card), or a combination thereof.

The vehicle navigation system 100 can comprise network interface hardware 118 for communicatively coupling the vehicle navigation system 100 with a mobile device 120 or a computer network. The network interface hardware 118 can be coupled to the communication path 104 such that the communication path 104 communicatively couples the network interface hardware 118 to other modules of the vehicle navigation system 100. The network interface hardware 118 can be any device capable of transmitting and/or receiving data via a wireless network. Accordingly, the network interface hardware 118 can include a communication transceiver for sending and/or receiving data according to any wireless communication standard. For example, the network interface hardware 118 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like.

As is noted above, the vehicle navigation system 100 can be communicatively coupled to a mobile device 120 via the network interface hardware 118. As described in more detail below, application data from various applications running on the mobile device may be provided from the mobile device 120 to the vehicle navigation system 100 via the network interface hardware. The mobile device 120 can be any device having hardware (e.g., chipsets, processors, memory, etc.) for communicatively coupling with the network interface hardware 118 and a cellular network 122. Specifically, the mobile device 120 can include an antenna for communicating over one or more of the wireless computer networks described above. Moreover, the mobile device 120 can include a mobile antenna for communicating with the cellular network 122. Accordingly, the mobile antenna can be configured to send and receive data according to a mobile telecommunication standard of any generation (e.g., 1G, 2G, 3G, 4G, 5G, etc.). Specific examples of a mobile device 120 include, but are not limited to, smart phones, tablet devices, e-readers, laptop computers, or the like.

The cellular network 122 generally includes a plurality of base stations that are configured to receive and transmit data according to mobile telecommunication standards. The base stations are further configured to receive and transmit data over wired systems such as public switched telephone network (PSTN) and backhaul networks. The cellular network 122 can further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the cellular network 122 can be utilized as a wireless access point by the mobile device 120 to access one or more servers (e.g., a first server 124 and/or a second server 126). The first server 124 and second server 126 generally include processors, memory, and chipset for delivering resources via the cellular network 122. Resources can include providing, for example, processing, storage, software, and information from the first server 124 and/or the second server 126 via the cellular network 122. Additionally, it is noted that the first server 124 or the second server 126 can share resources with one another over the cellular network 122 such as, for example, via the wired portion of the network, the wireless portion of the network, or combinations thereof.

The one or more servers may include third party servers that are associated with the applications that are running on the mobile device 120. For example, application data associated with a first application running on the mobile device (e.g., OpenTable) may be stored on the first server 124 that is operated by an organization that provides the first application, and application data associated with a second application running on the mobile device (e.g., Yelp!) may be stored on the second server 126 that is operated by an organization that provides the second application. It should be understood that the mobile device 120 may be communicatively coupled to any number of servers by way of the cellular network 122.

As described in more detail below, one or more of the servers may be associated with an organization that manufactures or otherwise maintains the vehicle navigation system 100 (i.e., an intermediary server). For example, the intermediary server may interface with the servers associated with the organizations that provide the applications, as described above. Application data from the various applications may first be provided to the intermediary server (e.g., for formatting or compliance verification) over one or more networks of the cellular network 122, and then provided to the mobile device 120.

Figure 2:
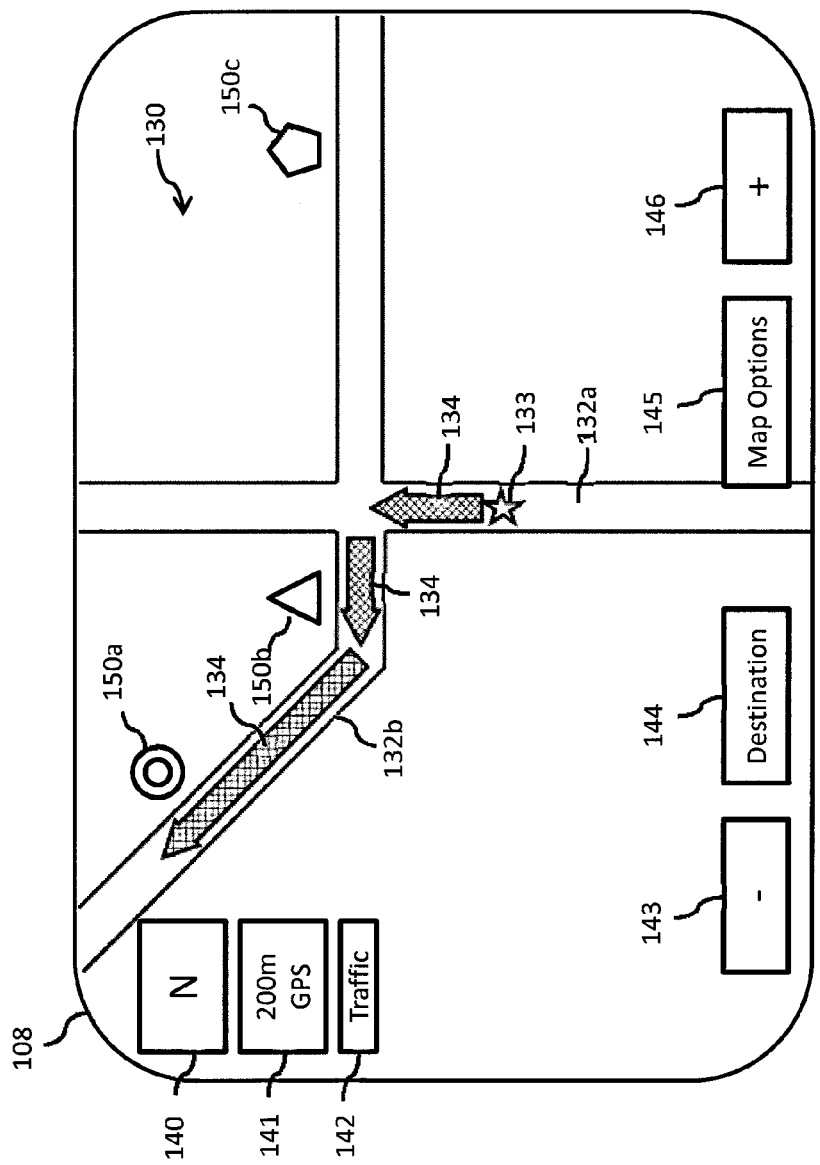
FIG. 2 schematically depicts a map provided on a display of the vehicle navigation system, wherein the map includes icons representing application data received from a mobile device according to one or more embodiments described and illustrated herein.

Referring now to FIG. 2, an exemplary map 130 presented by the display 108 of the vehicle navigation system 100 is schematically illustrated. The map 130 may display various roads associated with the geographic location within the proximity of the vehicle navigation system 100. The size of the area displayed on the map 130 (i.e., the scale) may be user-selectable. The geographic information displayed by the map 130 is based at least in part on information provided by the satellite module 114.

The exemplary map 130 includes a first road 132a that intersects with a second road 132b. The satellite module 114 provides a geographic location of the vehicle navigation system 100 and associated vehicle, which is then displayed on the map 130 by an icon 133. It should be understood that embodiments described and illustrated herein are not limited to any icon format or style, and that any type of icon may be used to depict the various information described herein. The user may have selected a destination via any one of the aforementioned input devices 108, 110, 112 such that that a route 134 is highlighted on the map 130 in embodiments that are configured to provide directions to a user-selected destination.

The exemplary map 130 further includes a user interface that is defined by various soft-keys positioned within the display 108. The soft-keys may be actuated via a touch screen on the display 108, and/or by the tactile input hardware 110 and/or the peripheral tactile input 112. The soft-keys may provide for the selection of any number of options or information. In the illustrated embodiment, the soft-keys on the present screen of the user interface provided on the display 108 are configured as a zoom-out button 143 that allows the user to zoom out and increase the geographical range that is displayed on the map 130, a Destination button 144 that generates a user interface that allows the user to select one or more destinations, a Map Options button 145 that allows the user to change various parameters of the map 130 (as described in more detail below), and a zoom-in button 146 that allows the user to zoom in and decrease the geographical range that is displayed on the map 130.

Also provided in the user interface of the exemplary map 130 are additional informational regions and buttons. Informational region 140 displays a direction that the vehicle is currently traveling as detected by the satellite module 114, informational region 141 displays information relating to the scale of the map 130 and the source of the geographic information, and button 142 may be selected by the user to toggle traffic information on and off within the display 108.

As described above, the vehicle navigation system 100 is configured to communicate with the mobile device 120 to receive application data from various applications that are stored or are otherwise running on the mobile device 120. Generally, the application data may be indicative of one or more entities and the geographic location of those one or more entities. Vehicle navigation systems 100 described herein receive the application data from the mobile device 120, determine the geographic location of one or more entities, and position an icon for each entity on the map 130 at a position that corresponds with the geographic location.

In the example depicted in FIG. 2, three applications running on the mobile device have provided application data to the vehicle navigation system, wherein the application data of each application corresponds to one entity. A first application has provided application data corresponding to a first entity that is represented by a first icon 150a, a second application has provided application data corresponding to a second entity that is represented by a second icon 150b, and a third application has provided application data corresponding to a third entity that is represented by a third icon 150c. As an example and not a limitation, the first application may be Yelp!, and the first icon 150a may represent a pharmacy that is in close proximity to the vehicle. The second application may be OpenTable, and the second icon 150b may represent a close-by restaurant, and the third application may be Gas Buddy, and the third icon 150c may represent a close-by gas station.

The icons 150a-150c are presented in the map 130 according to their geographic location that is provided in the associated application data. For example, the application data for each entity may include the physical address and/or GPS coordinates of the entity so that the vehicle navigation system 100 may present the icons representing entities at the proper location on the map 130.

Although each application is only providing application data for a single entity in FIG. 2, it should be understood that each application may send application data that represents many individual entities. As an example and not a limitation, the Gas Buddy application may send application data that corresponds to any number close-by gas stations, and OpenTable may send application data that corresponds to any number of close-by restaurants.

It should be understood that the icons 150a-150c depicted in FIG. 2 (and FIGS. 3 and 4) are generic. The icons may take on any size, shape, or color. In some embodiments, the icon configuration may represent the icon that is associated with the particular application.

The application data may be formatted either by the third party that is associated with the application, an application programming interface (API) on the mobile device 120, or the navigation system 100 such that it is properly displayed on the display 108. For example, the icon size should be such that the location of the associated entity may be properly discerned by the user. If the icon is too large, it may take up too much space on the display 108 and it may be difficult for the user to determine the actual location of the entity represented by the icon. The size of the icon may also depend on the size and/or resolution of the display 108.

In some embodiments, an API runs on the mobile device 120 and provides the formatted application data received from the various applications to the vehicle navigation system 100. Thus, the API is in communication with the various applications running on the mobile device 120. In other embodiments, the third party application providers may provide the application data in a proper format for display on the vehicle navigation system 100 directly to the applications running on the mobile device 120. The vehicle navigation system 100 may then receive this formatted application data directly from the applications. For example, the user may register his or her applications with the various third party application providers so that the third party application providers then send the application data to the mobile device in a proper format for display on the display 108 of the vehicle navigation system 100. In still other embodiments, the vehicle navigation system 100 may receive the application data directed from the applications on the mobile device 120, and then format the data for display on the display 108 of the vehicle navigation system 100.

Figure 3:
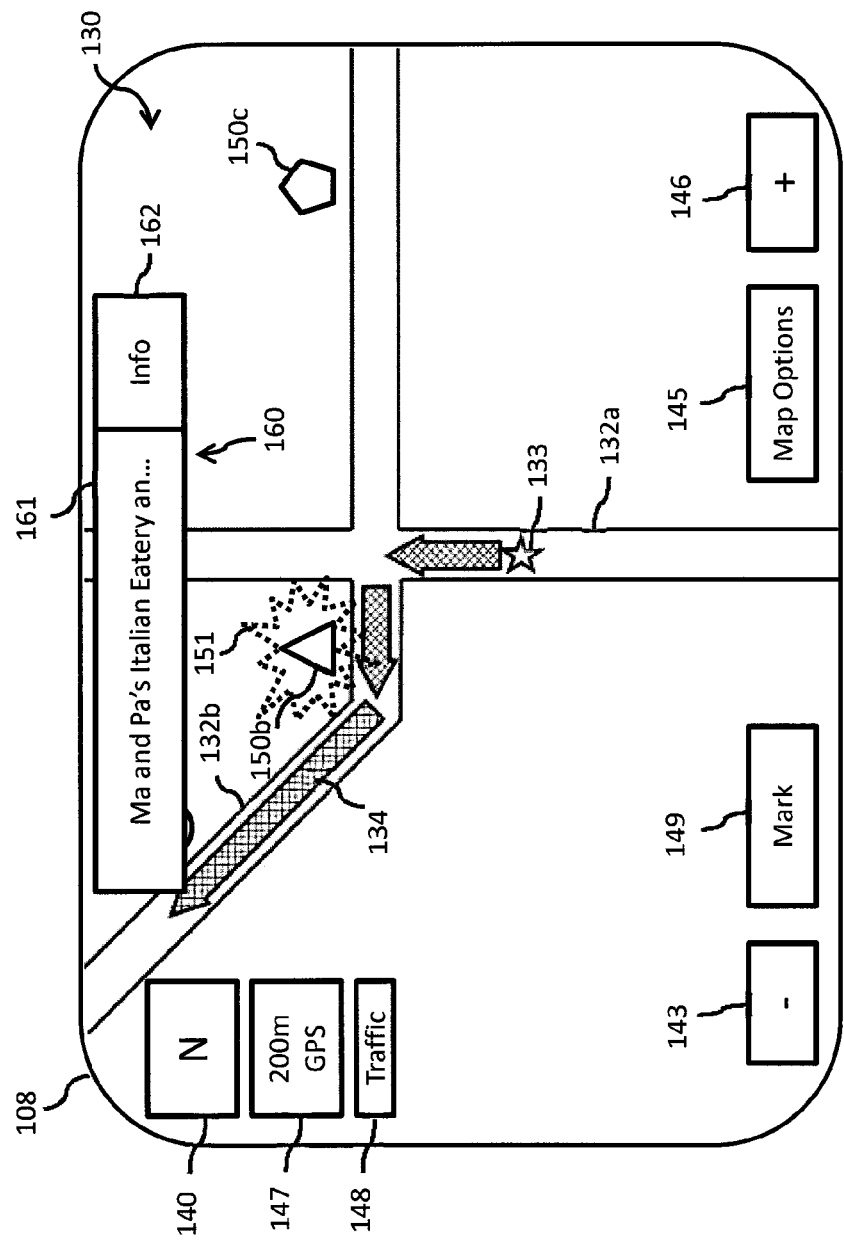
FIG. 3 schematically depicts the map depicted in FIG. 2 where an icon has been selected and information regarding the entity associated with the selected icon is displayed according to one or more embodiments described and illustrated herein.

Referring now to FIG. 3, in one embodiment the user may select an icon 150a-150c that is displayed on the map to receive more information regarding the entity that was provided by the application associated with the icon 150a-150c. In the illustrated embodiment, the user has selected, by a user input, the second icon 150b associated with the second application running on the mobile device 120 by any one of the above-described input devices. Shape 151 represents a user selection of the second icon 150b (e.g., by touching a touch screen-enabled display 108 surface). Returning to the above-described nonlimiting example, the second icon 150b may represent a restaurant as determined by OpenTable. Selection of the OpenTable icon 150b causes the vehicle navigation system 100 to display information regarding the restaurant associated with the OpenTable icon 150*b*. In the illustrated example, the name of the restaurant is displayed in an informational bar 161 of an entity information display 160 at the top of the display 108. It should be understood that embodiments are not limited to location and format of the display of the information associated with the entity.

The entity information display 160 may further include a more information button 162 that causes the display 108 to provide additional information regarding the entity corresponding to the application data associated with the entity, which is described below with respect to FIG. 4. Selection of an icon 150*a*-150*c* may also cause the display of additional soft-key buttons, such as the Mark button 149, which marks the entity associate with the icon 150*a*-150*c* for future information retrieval.

Embodiments may also provide for the display of additional, more detailed information regarding the entity of the selected icon. As an example, user selection of the more information button 162 (or similar button) may cause the additional detailed information regarding the entity to be display on the display 108 of the vehicle navigation system 100. An example of the displayed of the additional detailed information regarding the restaurant associated with OpenTable icon 150*b* is schematically depicted in FIG. 4. The additional, detailed information 164 of the illustrated embodiment is provided in a detailed information window 163 positioned on the map 130. It should be understood that the additional, detailed information 164 may be displayed in other formats and configurations, such as on a dedicated screen, a different location on the map 130, etc.

The detailed information 164 may include, but is not limited to, the name of the entity (in the present example, "Ma and Pa's Italian Eatery and Shop"), the physical address of the entity, and a telephone number associated with the entity. Additional information may also be provided, such as a website address, an e-mail address, an average rating (e.g., 4/5 stars), and any other information that may be useful regarding the particular entity.

In some embodiments, the display 108 may present a call button 165 that a user may select to call the particular entity. In other embodiments, the user may call the entity by selecting the telephone number, if the telephone number comprises active text that causes the phone functionality of the mobile device 120 to call the phone number provided in the active text.

Figure 4:
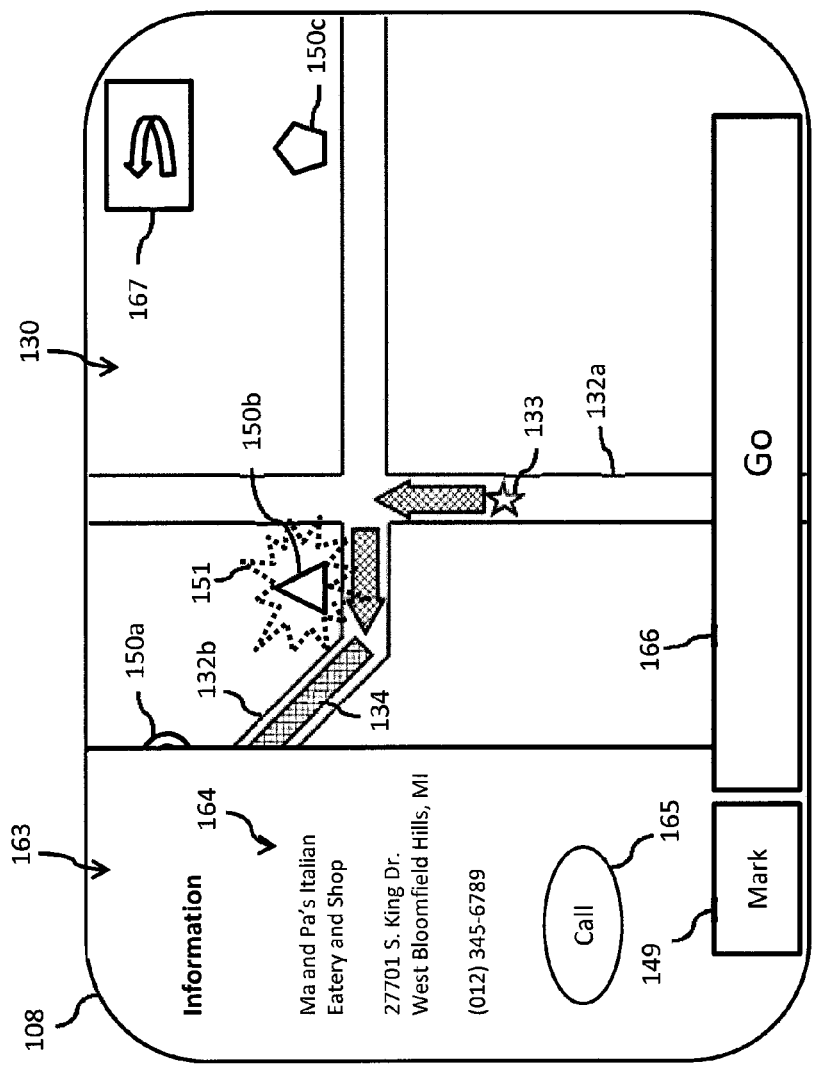
FIG. 4 schematically depicts the map depicted in FIG. 2 with additional detailed information regarding the entity associated with the icon selected in FIG. 3 according to one or more embodiments described and illustrated herein.
Figure 5:
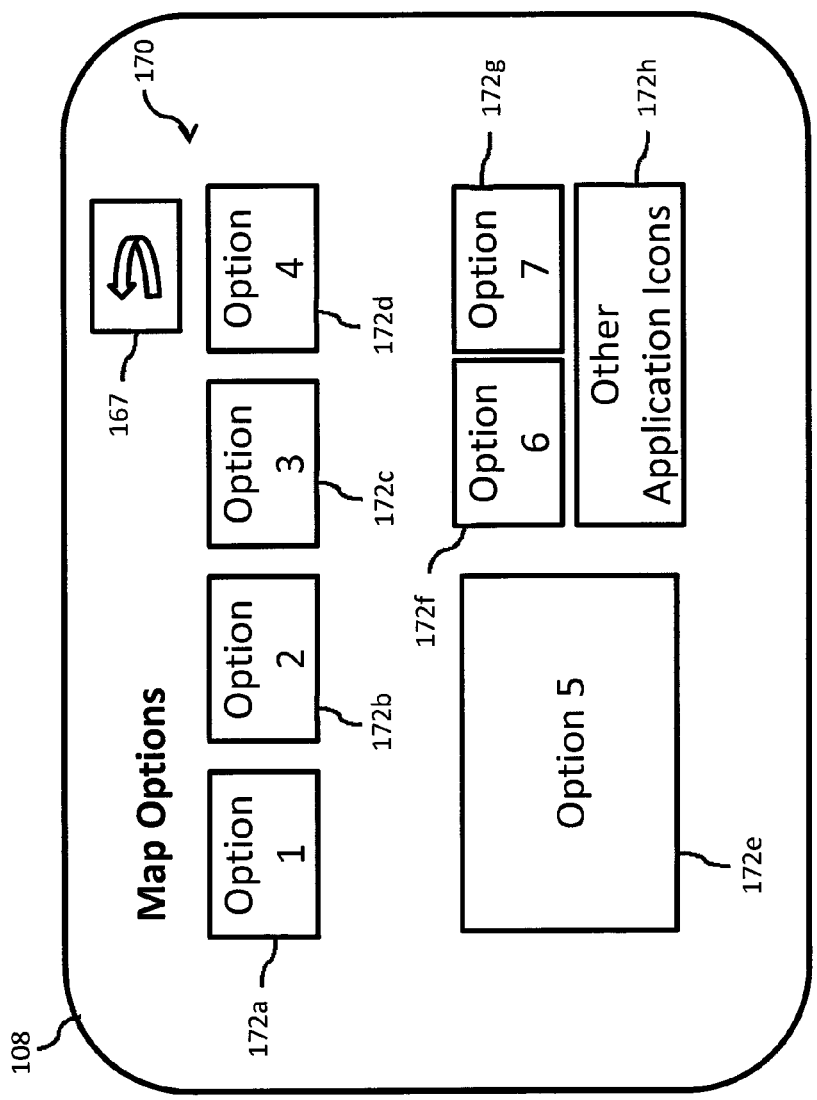
FIG. 5 schematically depicts a map options screen presented on the display of a vehicle navigation system according to one or more embodiments described and illustrated herein.

The screen depicted in FIG. 4 further includes a button (e.g., Go button 166) that sets the physical address of the entity associated with the selected icon as a destination within the vehicle navigation system 100. The vehicle navigation system 100 may then provide direction to the entity. The display 108 may also present a Back button 167 to return the user to the previous screen (e.g., the screen represented in FIG. 3).

The Map Options button 145 (see FIGS. 2 and 3) causes the vehicle navigation system 100 to display a map options user interface 170 wherein the user may set various parameters associated with the vehicle navigation system 100. The exemplary map options user interface 170 depicts a plurality of generic Options buttons 172*a*-172*h* that are associated with a plurality of parameters. For example, one or more of the Options buttons 172*a*-172*g* may dictate how the map 130 is presented, such as by a map-only display without additional information, a dual map that may provide two maps on the display 108, the display of a turn list, and the like. The Options buttons 172*a*-172*g* may also allow a user to select points of interest, set a speed limit, set traffic reporting options, etc.

Figure 6:
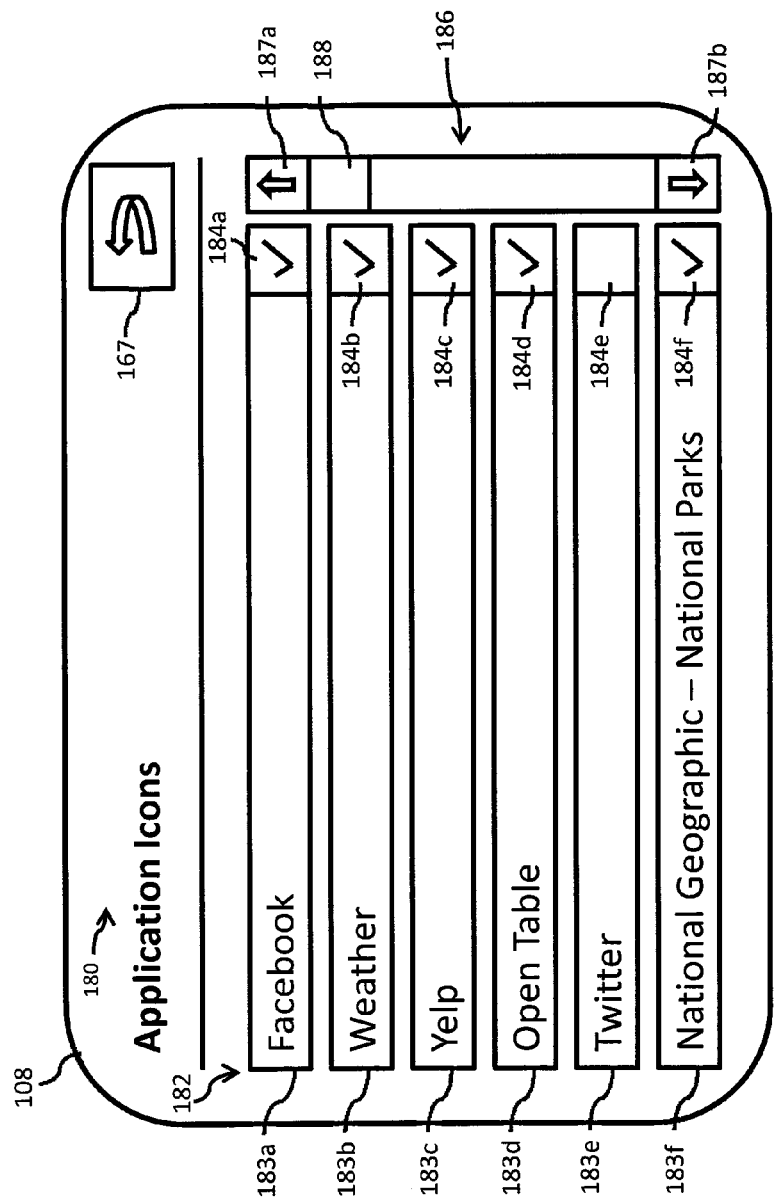
FIG. 6 schematically depicts an application icon options screen presented on the display of a vehicle navigation system according to one or more embodiments described and illustrated herein.

Option button 172*h* provides options relating to the display of the application data provided by the mobile device 120. Selection of Option button 172*h* may cause the vehicle navigation system 100 to display an application icon options screen 180 on the display 108. FIG. 6 depicts an exemplary application icon options screen 180 according to one embodiment. Generally, the application icon options screen 180 depicted in FIG. 6 allows a user to select which applications he or she wishes to provide icons and information to the display 108, and which applications he or she wishes to filter out. The application icon options screen 180 comprises a list of applications 182 that lists compatible application names 183*a*-183*f* of applications that are compatible with the vehicle navigation system 100. Each compatible application name 183*a*-183*f* has a check box or other selection feature that allows the user to select or deselect the particular compatible application. The list of applications 182 may further include a scrollbar 186 if the number of compatible applications is greater than what may be presented on the display 108. User may scroll the bar 188 to navigate the list of applications 182, or use an up arrow 187*a* or the down arrow 187*b*. The list of applications 182 may also be navigated by gestures, such as flicking the list using his or her finger on a touch screen of the display 108.

In the illustrated example, the user has selected Facebook 183*a*, Weather 183*b*, Yelp! 183*c*, OpenTable 183*d*, and National Geographic—National Parks 183*f* applications, and deselected the Twitter 183*e* application. Accordingly, the vehicle navigation system 100 may display application data associated with only those applications that are selected by the user. It is noted that some applications may not have geographic location information associated with a physical address or location, such as the Weather and Twitter applications. The icons and/or application data associated with these applications, or other applications where the application data does not include a physical address or location, may be presented at one or more regions of the display 108 (e.g., one or more corners of the display 108).

Figure 7:
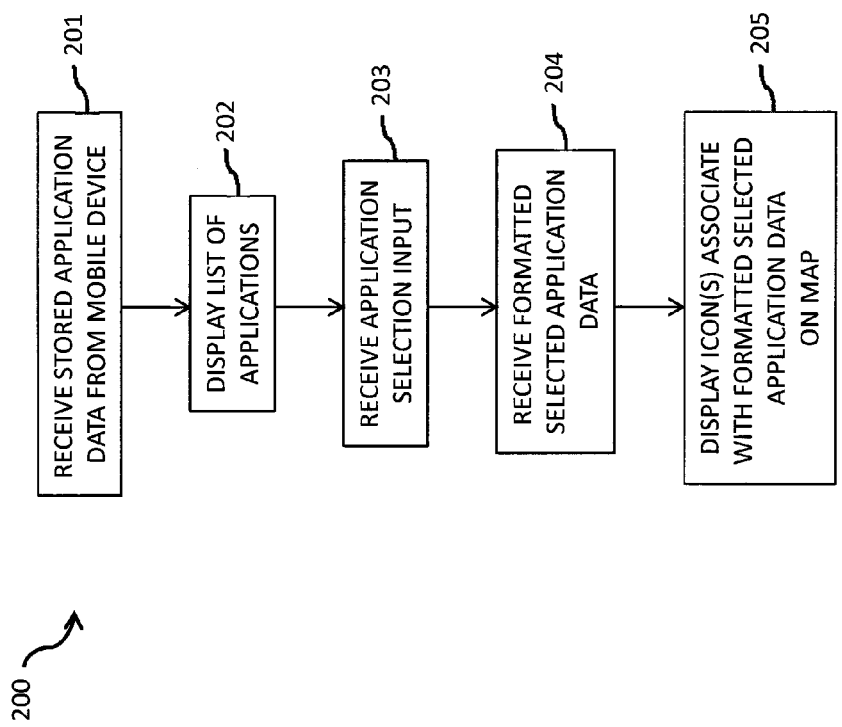
FIG. 7 is a flow chart that depicts a process of compatible application detection and selection according to one or more embodiments described and illustrated herein.

Referring now to FIG. 7, a flow chart 200 of how applications running on the mobile device 120 are detected and filtered for display on the vehicle navigation system 100 according to one embodiment is depicted. At block 201, the vehicle navigation system 100 may receive stored applications data from the mobile device 120. The stored application data represents the names of the compatible applications that are running on the mobile device 120. In one embodiment, the stored applications data is stored in a file on the mobile device 120. In another embodiment, the stored applications data is stored on a remote server that is accessed by the mobile device 120 and/or the vehicle navigation system 100. The stored applications data may be periodically updated as the user adds and removes applications from his or her mobile device 120.

Once the vehicle navigation system 100 is aware of which compatible applications are running on the mobile device 120, the vehicle navigation system 100 may display the list of applications at block 202. For example, the list of applications may be configured as the list of applications 182 depicted in FIG. 6 wherein the user may select or deselect various compatible applications. At block 203, the vehicle navigation system 100 receives application selection input that corresponds with the applications that the user desires to have information displayed on the vehicle navigation system 100. At block 204, the vehicle navigation system 100 receives formatted application data that is in a format that is compatible with the display 108 vehicle navigation system 100. As stated above, in some embodiments an API running on the mobile device 120 may format that application data, or the applications may format the application data directed (e.g., the third party servers of the various applications may provide the formatted application data). However, in other embodiments, the vehicle navigation system may format the application data for presentation on the display 108.

At block 205, the vehicle navigation system 100 displays the icons corresponding to the application data of the various selected applications as the vehicle travels. As the vehicle travels down the road, the icons will change, as only those icons representing entities in close proximity to the vehicle may be displayed.

It should now be understood that embodiments of the present disclosure are directed to vehicle navigation systems and methods wherein applications running on a mobile device provide application data to the vehicle navigation system. More specifically, icons representing entities associated to the application data are displayed at locations on a map corresponding to a physical address or location of the entities. As an example and not a limitation, an application running on a mobile device that is communicatively coupled to the navigation system may be programmed to provide information regarding restaurants (other other businesses, organizations, etc.) that are in proximity to a present location. Application data regarding the restaurants may be provided by the application to the vehicle navigation system such that icons are displayed on the map of the vehicle navigation system at the proper locations that correspond to the physical addresses of the nearby restaurants. In this manner, icons associated with entities provided by applications running on a mobile device may be populated onto a map of a vehicle navigation system.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of presenting information originating from a mobile device on a vehicle navigation system display of a vehicle, the method comprising:
   receiving, by a vehicle navigation system, application data from a plurality of compatible applications operating on the mobile device, wherein:
      the plurality of compatible applications are a filtered subset of all applications operating on the mobile device, the filtered subset based on an ability to communicate with the vehicle navigation system; and
      the application data from the plurality of compatible applications represents one or more entities in proximity to the vehicle;
   displaying, on the vehicle navigation system display, a list of the plurality of compatible applications operating on the mobile device;
   receiving an application selection input, wherein the application selection input indicates a selection of one or more selected compatible applications of the plurality of compatible applications; and
   displaying one or more icons representing the application data from the one or more selected compatible applications on a map presented on the vehicle navigation system display, wherein one or more icons are positioned on the map according to a geographic location of the one or more entities.

2. The method of claim 1, wherein the application data received by the vehicle navigation system is formatted by the vehicle navigation system for display of the one or more icons on the map.

3. The method of claim 1, further comprising displaying information associated with the application data in response to receiving a user input selecting a selected icon of the one or more icons, wherein the information is representative of an entity associated with the selected icon.

4. The method of claim 3, wherein the information comprises a company name.

5. The method of claim 3, wherein the application data received by the vehicle navigation system is such that the information is formatted for display on the vehicle navigation system display upon receipt by the vehicle navigation system.

6. The method of claim 3, further comprising displaying detailed information associated with the application data in response to receiving a second user input associated with the information, wherein the detailed information is representative of the entity associated with the selected icon.

7. The method of claim 6, wherein the detailed information comprises a telephone number and a physical address.

8. The method of claim 1, wherein the application data at least partially originates from a third party server associated with the application operating on the mobile device.

9. A vehicle navigation system comprising:
   one or more processors;
   a vehicle navigation system display communicatively coupled to the one or more processors;
   a user input device communicatively coupled to the one or more processors;
   a satellite module communicatively coupled to the one or more processors and configured to provide geographic location data to the one or more processors;
   a non-transitory computer-readable medium storing computer-executable instructions that, when executed by the one or more processors, cause the vehicle navigation system to:
      receive the geographic location data from the satellite module, wherein the geographic location data is indicative of a geographic location of a vehicle associated with the vehicle navigation system;
      generate and display a map corresponding to a proximity of the geographic location of the vehicle;
      receive application data from a plurality of compatible applications operating on a mobile device, wherein:
         the plurality of compatible applications are a filtered subset of all applications operating on the mobile device, the filtered subset based on an ability to communicate with the vehicle navigation system; and
         the application data from the plurality of compatible applications represents one or more entities in proximity to the vehicle;
      display, on the vehicle navigation system display, a list of the plurality of compatible applications operating on the mobile device;
      receive an application selection input, wherein the application selection input indicates a selection of one or more selected compatible applications of the plurality of compatible applications provided in the list; and
      display one or more icons representing the application data from the one or more selected compatible applications on the map according to a geographic location of the one or more entities.

10. The vehicle navigation system of claim 9, wherein the application data is formatted by the vehicle navigation system for display of the one or more icons on the map.

11. The vehicle navigation system of claim 9, wherein the computer-executable instructions further cause the vehicle navigation system to display information associated with the application data in response to receiving a user input selecting a selected icon of the one or more icons, wherein the information is representative of an entity associated with the selected icon.

12. The vehicle navigation system of claim 11, wherein the application data received by the vehicle navigation system is such that the information is formatted for display on the vehicle navigation system display upon receipt by the vehicle navigation system.

13. The vehicle navigation system of claim 11, wherein the computer-executable instructions further cause the vehicle navigation system to display detailed information associated with the application data in response to receiving a second user input associated with the information via the user input device, wherein the detailed information is representative of the entity associated with the selected icon.

14. The vehicle navigation system of claim 13, wherein the detailed information comprises a telephone number and a physical address.

15. The vehicle navigation system of claim 9, wherein the application data at least partially originates from a third party server associated with the application operating on the mobile device.

16. A method of presenting information originating from a mobile device on a vehicle navigation system display of a vehicle, the method comprising:

receiving, by a vehicle navigation system, a file containing a list of compatible applications operating on the mobile device, wherein the compatible applications are a filtered subset of all applications operating on the mobile device, the filtered subset based on an ability to communicate with the vehicle navigation system;

displaying, on the vehicle navigation system display, a list of compatible applications operating on the mobile device;

receiving a selection of one or more compatible applications provided in the list of compatible applications;

receiving, by a vehicle navigation system, application data from each selected compatible application operating on the mobile device, wherein the application data from each selected compatible application represents an entity in proximity to the vehicle, and the application data from each selected compatible application at least partially originates from a third party server associated with the selected compatible application operating on the mobile device; and displaying an icon representing the application data for each selected compatible application on a map presented on the vehicle navigation system display, wherein each icon is positioned on the map according to a geographic location of the entity associated with the icon.

17. The method of claim 16, further comprising displaying information associated with the application data in response to receiving a user input selecting the icon, wherein the information is representative of the entity.

18. The method of claim 16, further comprising displaying detailed information associated with the application data in response to receiving a second user input associated with the information, wherein the detailed information is representative of the entity.

* * * * *